(12) United States Patent
Yamamoto

(10) Patent No.: US 7,145,569 B2
(45) Date of Patent: Dec. 5, 2006

(54) DATA PROCESSING METHOD

(75) Inventor: Hiroshi Yamamoto, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 134 days.

(21) Appl. No.: 10/101,506

(22) Filed: Mar. 19, 2002

(65) Prior Publication Data
US 2002/0135596 A1    Sep. 26, 2002

(30) Foreign Application Priority Data
Mar. 21, 2001    (JP)    ............................. 2001-080226

(51) Int. Cl.
G06T 11/00    (2006.01)
(52) U.S. Cl. .................................... 345/581
(58) Field of Classification Search ................ 345/418, 345/419, 473, 581; 348/565, 673, 687, 580; 709/231; 340/438
See application file for complete search history.

(56) References Cited

U.S. PATENT DOCUMENTS

| 5,299,301 | A | * | 3/1994 | Nohmi et al. ................ 345/581 |
| 5,841,486 | A | * | 11/1998 | Ando et al. .................. 348/673 |
| 6,064,772 | A | | 5/2000 | Tanno et al. |
| 6,088,733 | A | * | 7/2000 | Kikuchi ........................ 709/231 |
| 6,300,983 | B1 | * | 10/2001 | Fels et al. .................... 348/580 |
| 6,690,268 | B1 | * | 2/2004 | Schofield et al. ........... 340/438 |

FOREIGN PATENT DOCUMENTS

| JP | 63-142780 | 6/1988 |
| JP | 64-48573 | 2/1989 |
| JP | 5-30442 | 2/1993 |
| JP | 09-027044 | 1/1997 |
| JP | 2000-339488 | 12/2000 |
| WO | WO 97/00582 | 1/1997 |
| WO | WO 97/03517 | 1/1997 |
| WO | WO 98/46323 | 10/1998 |

OTHER PUBLICATIONS

European Search Report dated Jul. 12, 2006, from corresponding European Application 02006421.8-2218.
Eihachiro Nakamae et al. "A Montage Method: The Overlaying of the Computer Generated Images onto a Background Photograph" Siggraph Conference on Computer Graphics, Aug. 18, 1986, pp. 207-214, XP002386622.

* cited by examiner

Primary Examiner—Almis R. Jankus
(74) Attorney, Agent, or Firm—Katten Muchin Rosenman LLP

(57) ABSTRACT

A program executing machine generates display image data including data of at least first and second image areas, and changes a display parameter of the second image area in accordance with a characteristic parameter detected in the first image area. The characteristic parameter is, e.g., the mean brightness value of a predetermined area in a dynamic image within the first image area. The brightness of the entire or part of the second image area is changed in accordance with the mean brightness value of the predetermined area. After detecting the mean brightness value of the predetermined area as the characteristic parameter, the program executing machine changes the brightness of a predetermined area within the second image area. A video game with higher reality and higher entertainment is thus realized.

23 Claims, 5 Drawing Sheets

DATA PROCESSING METHOD

This application is related to Japanese Patent Application No. 2001-80226 filed on Mar. 21, 2001, based on which this application claims priority under the Paris Convention and the contents of which are incorporated herein by reference.

BACKGROUND OF THE INVENTION

1. Field of the Invention

The present invention relates to data processing methods suitable for, e.g., simulation games, and also to data processing programs, recording medium having recorded therein the programs, and apparatus for executing the programs.

2. Description of the Related Art

In video games, some simulation games (SLGs) partially use therein dynamic images of actually-taken scenes. In simulation games, for example, a view from the driver's seat of a train or car is displayed as a game image, which enables the player to play the same (virtually drive a train or the like) with the same view as that of the actual driver.

In such simulation games for virtually driving trains and the like, the game image is generally divided into two parts, i.e., a part where a dynamic image of scenes viewed through a window in front of the driver's seat is displayed (hereinafter referred to as through-window image part) and a part where an image including the operation panel, window frame, etc., near the driver's seat is displayed (hereinafter referred to a not-through-window image part). In the through-window image part, displayed are actual scenes viewed through a window in front of the driver's seat of an actual running train or the like. Contrastingly, in the not-through-window image part, displayed is an image including the operation panel, window frame, etc., generated by, e.g., computer graphic.

In the through-window image parts actually-taken scenes are displayed. Thus, when the train or the like goes into a tunnel, the image in the through-window image part gets dark, Inversely, the train or the like goes out of the tunnel, the image in the through-window image part gets light. Contrastingly, in the not-through-window image part, an image generated by computer graphics is displayed. Thus, even when the train or the like enters or goes out of a tunnel, the image in the not-through-window image part does not change at all.

That is, in the conventional games for virtually driving trains and the like, a real image influenced by external light can be provided in the through-window image part but an image in the not-through-window image part is not influenced by the external light at all. Therefore, the video image of such a conventional game entirely lacks reality, which makes the game poor in ambient.

SUMMARY OF THE INVENTION

An object of the present Invention is to provide data processing methods, data processing programs, recording media recording thereon the programs, and apparatus for executing the programs, which are capable of realizing games with reality and sufficient ambience in which at least a dynamic image of actually-taken scenes is displayed on a screen.

According to the present invention, display image data having at least first and second images is generated, and a characteristic parameter of the first image is determined, then a display parameter of the second image is changed in accordance with the determined characteristic parameter.

According to an aspect of the present invention, the characteristic parameter is determined based on images composing a dynamic image. In particular, according to the present invention, the mean brightness value of at least part of the dynamic image providing actually-taken scenes, is detected as the characteristic parameter of the dynamic image, wherewith the brightness of at least part of the second image as changed in accordance with the detected mean brightness value.

That is, in the present invention, the second image to be influenced by the brightness of the dynamic image has been predetermined and the brightness thereof is changed in accordance with the brightness of the dynamic image. Games with reality and sufficient ambience can be realized thereby.

Other and further objects and features of the present invention will become obvious upon understanding of the illustrative embodiment about to be described in connection with the accompanying drawings or will be indicated in the appended claims, and various advantages not referred to herein will occur to one skilled in the art upon employing the invention in practice.

DETAILED DESCRIPTION OF THE PREFERRED EMBODIMENT

Figure 1:
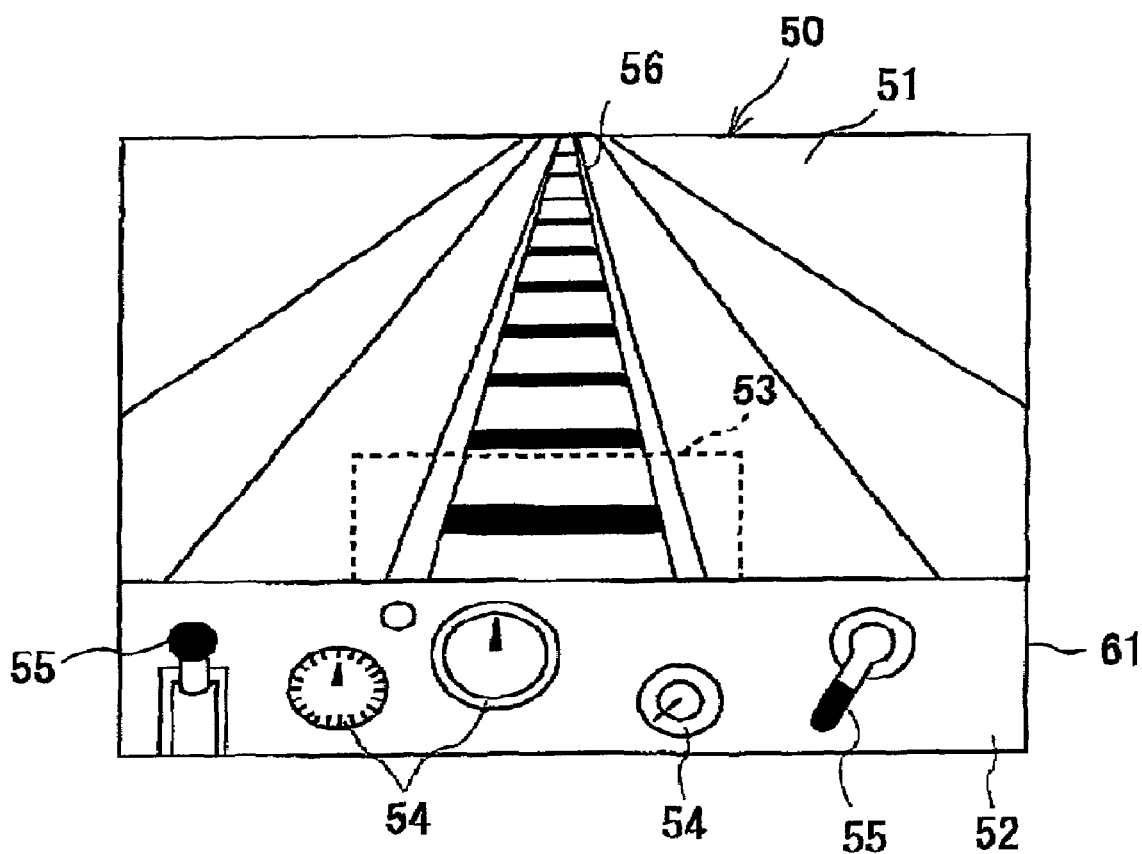
FIG. 1 illustrates an example of game image of a simulation game according to an embodiment of the present invention.

An embodiment of the present invention will be described with reference to the accompanying drawings. It is to be noted that the same or similar reference numerals are applied to the same or similar parts and elements throughout the drawings, and the description of the same or similar parts and elements will be omitted or simplified.

Outline of Simulation Game

FIG. 1 illustrates an exemplary game image 50 of a simulation game according to an embodiment of the present invention. The simulation game of this example is for virtually driving a train.

The game image 50 illustrated in FIG. 1 represents a view from the driver's seat of an actual train. The game image 50 is divided into first and second image areas 51 and 61, respectively. The first image area 51 is the region where a dynamic image of scenes viewed through a window in front of the driver's seat is displayed. The image in the first image area 51 is provided by actually-taken scenes viewed through the window in front of the driver's seat of an actual train (for example, a railway track 56, station precincts, scenery along the railway line, and so on). The second image area 61 is the region where an operation panel 52 near the driver's seat is displayed. The operation panel 52 is an object generated by, e.g., computer graphics, which includes various objects such as meters 54 and operation levers 55.

In the first image area 51 displayed are actually-taken scenes through the window in front of the driver's seat of the actual train. Thus, when the train goes into a tunnel, the image in the first image area 51 gets dark. Inversely, when the train goes Cut 0s the tunnel, the image in the first image area 51 gets light.

In such a case, to enhance reality of the entire game image and realize a game with sufficient ambience, it is desirable that the brightness of the image of the operation panel 52 is changed in accordance with the change of brightness of the first image area 51 that is displaying actually-taken scenes.

For this purpose, the program of this simulation game executes processing for changing a display parameter of the second image area 61 (the brightness of the image of the operation panel 52 in this embodiment) in accordance with a characteristic parameter of the first image area 51 (the brightness in this embodiment). This game program further executes processing for switching on/off the lights of the meters 54 on the operation panel 52 in accordance with the change in brightness of the first image area 51.

In order to realize to change the brightness of the operation panel 52 and switch on/off the lights of the meters 54 in accordance with the change in brightness of the first image area 51, the game program executes the below-described processes.

This game program has predetermined the second image area 61 (the operation panel 52 in this example) to be influenced by the light through the window in front of the driver's seat, i.e., the brightness of the first image area 51 as described above. This game program calculates brightness values in a predetermined area 53 within the first image area 51 and changes the brightness of the operation panel 52 in accordance with the mean brightness value of the predetermined area 53.

Besides, this game program, when the mean brightness value of the predetermined area 53 is not more than a predetermined threshold, executes processing for switching on the lights of the meters 54, inversely when the mean brightness value of the predetermined area 53 exceeding the predetermined threshold, executes processing for switching off the lights of the meters 54.

The predetermined area 53 is desirably provided above the railway track 56 hardest to be influenced by, e.g., illumination in a station or tunnel, and is a region having a certain expanse(above the railway track 56 nearest to the driver's seat in this example) in the first image area 51. In another example, the predetermined area 53 may be the entire of the first image area 51, or may include a plurality of areas within the first image area 51.

The predetermined threshold has been determined by pre-estimating the mean brightness value of the predetermined area 53 when the train goes into a tunnel or when the night comes on.

Schematic Structure of Game Program

The game program has the below-described configuration, which realizes processing for changing the brightness of the operation panel 52 and for switching on/off the lights of the meters 54, in accordance with the brightness of the first image area 51.

Figure 2:
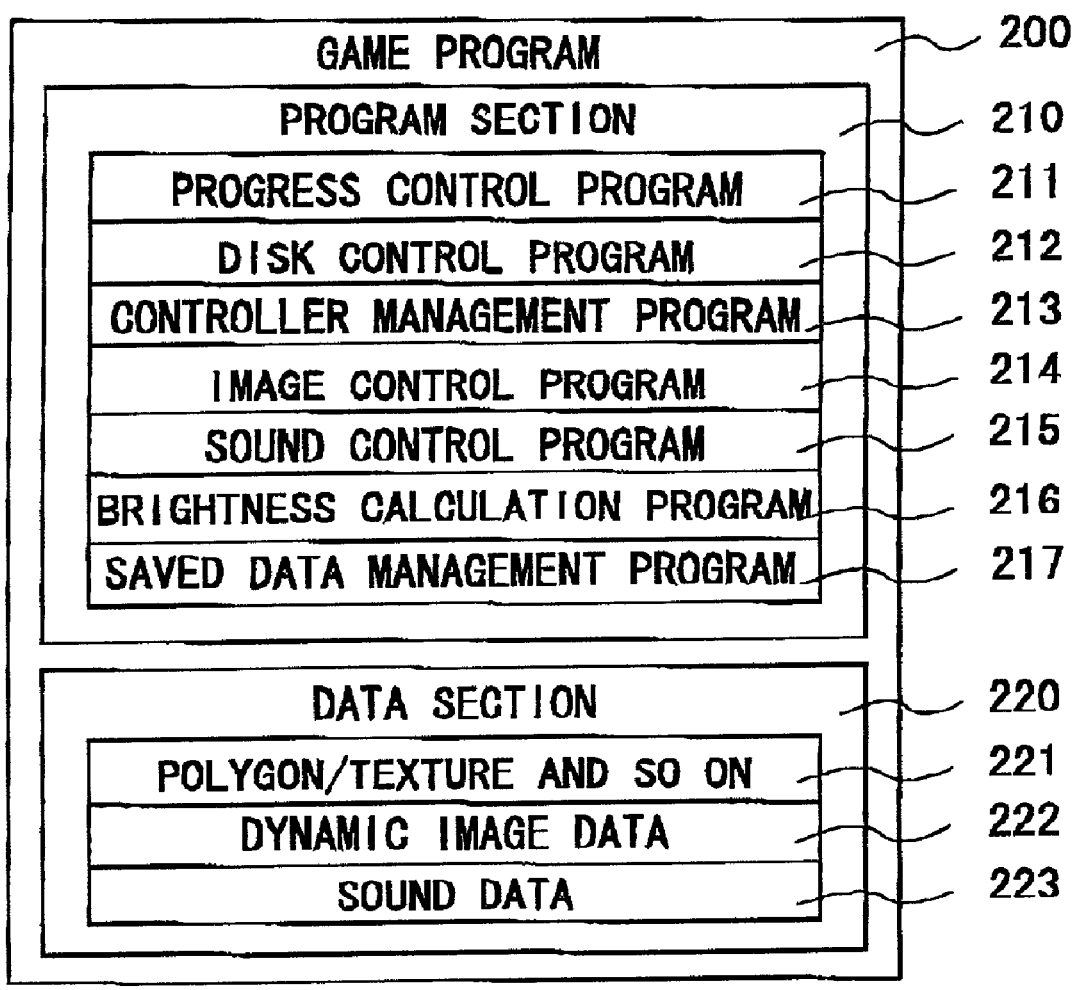
FIG. 2 illustrates a schematic structure of the game program of the simulation game.

The game program has the data structure illustrated in FIG. 2, for example. It is to be noted that the data structure illustrated in FIG. 2 conceptually represents only principal components of a program section and a data section in the game program, and it does not represent the actual physical structure of the program. The game program can be read out from a recording medium, e g., an optical disk such as a DVD-ROM or CD-ROM, or a semiconductor memory, or alternatively can be downloaded through a transmission medium such as a communication line.

Referring to FIG. 2, the game program 200 is generally comprised of a program section 210 by which the main CPU of a video game machine, which will be described later, executes the game, and a data section 220 including various data to be used in executing the game. A detailed configuration of the video game machine will be described later.

The data section 220 includes at least polygon/texture data and so on 221, actually-taken dynamic image data 222, and actual sound data 223 including environmental sounds.

The polygon/texture data and so on 221 is data for generating polygons and a texture to be used in generating a computer graphic image in the second image area 61 (e.g., the operation panel 52 illustrated in FIG. 1) in this game. The dynamic image data 222 is data of scenes, e.g., actually taken through the window in front of the driver's seat of an actual running train (e.g., data of the first image area 51 illustrated in FIG. 1). Such dynamic image data may have been compressed in the form of, e.g., motion JPEG or the like. The sound data 223 is data of actual environmental sounds, e.g., recorded in an actual running train. The data section 220 may further include waveform data used in generating a game sound, a game music, a sound effect, etc.

The program section 210 includes, as programs for executing this game, a progress control program 211, a disk control program 212, a controller management program 213, an image control program 214, a sound control program 215, a brightness calculation program 216, a saved data management program 217, etc.

The progress control program 211 is for the main CPU of a video game machine to control the progress of this game. The disk control program 212 is for the main CPU to read out data from a below-described optical disk or HDD upon the start of this game or in the course of this game. The controller management program 213 is for the main CPU to manage operation input signals obtained when the player operates buttons and left and right analogue operation portions on a game controller, operation modes of the controller, vibration of the controller, etc. The image control program 214 is for the main CPU to make a below-described graphic processor unit (GPU) generate a game image such as the image in the first image area 51 and the operation panel 52 in the game image 50 illustrated in FIG. 1, and display it on a television monitor screen. The sound control program 215 is for the main CPU to make a below-described sound processor unit (SPU) generate a sound or the like in the game and output it. The brightness calculation program 216 is for the main CPU to calculate the mean brightness value of the predetermined area 53 in the game image 50. The saved data management program 217 is for the main CPU to manage saved data, i.e., store data generated in this game or data in the course of the game into a below-described memory card or the like as saved data, or to read out saved data from the memory card or the like.

Flow of Execution of Game Program

The flow of a principal procedure in the game program illustrated in FIG. 2 will be described below with reference to the flowchart of FIG. 3. The below-described flow is implemented by executing each program component on the main CPU of a video game machine. In below description, only a particularly characteristic procedure of the present invention, i.e., procedures co realize the change of the brightness of the operation panel 52 and the switch of the lights of the meters 54 in accordance with the brightness of the first image area 51 will be described.

Figure 3:
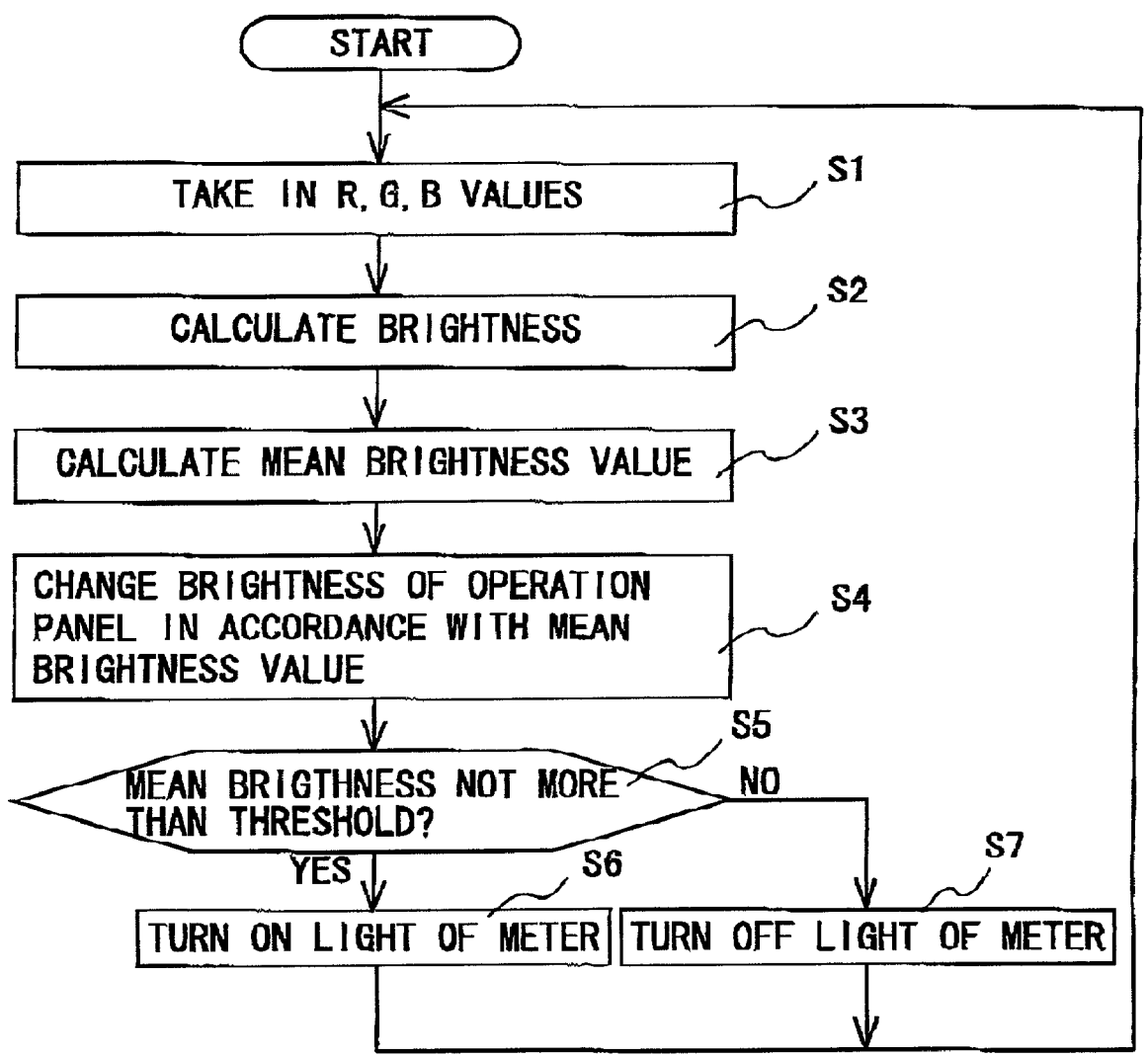
FIG. 3 is a flowchart of a principal procedure in the game program.

Referring to FIG. 3, while this game being executed, the brightness calculation program 216 takes in the RGB values of each pixel in the predetermined area 53 illustrated in FIG. 1 at step S1.

In step S2, the brightness calculation program 216 calculates the brightness value Y of each pixel in the predetermined area 53 by the following equation (1) using the taken-in RGB values:

$$Y=0.299R+0.587G+0.114B \qquad (1).$$

In another example, the brightness calculation program 216 may be designed so that the brightness of each pixel in the predetermined area 53 may be judged by the RGB values themselves instead of calculating the brightness value Y by the equation (1). For example, in the case of RGB values of eight bits, each pixel in the predetermined area 53 is judged according to the brightness calculation program 216 that the brighter the pixel is, the nearer to "255" ("11111111" in binary expression) the RGB values are, inversely, the darker the pixel is, the nearer to "0" ("00000000" in binary expression) the RGB values are.

In step S3, the brightness calculation program 216 calculates the mean brightness value of the predetermined area 53 using the brightness value Y of each pixel calculated in step S2.

In step S4, the image control program 214 changes the brightness of the operation panel 52 based on the mean brightness value of the predetermined area 53 obtained according to the brightness calculation program 216. That is, when the mean brightness value of the predetermined area 53 increases, the image control program 214 makes the operation panel 52 brighter accordingly. Inversely, when the mean brightness value f the predetermined area 53 decreases, the image control program makes the operation panel 52 darker accordingly. The image control program 214 may be so designed as to include a procedure for evenly or unevenly changing the brightness of the operation panel 52. In the case of unevenly changing the brightness of the operation panel 52, the image control program 214 may include a procedure for making a portion near the window bright and decreasing the brightness as the distance from the window increases, or making the shadow of each lever 55 darker than the other portion. Besides, the manner of changing the brightness of the operation panel 52 in accordance with the brightness (mean brightness value) of the predetermined area 53 may have been predetermined. In the case where the manner of changing has been predetermined, even if any dynamic image is displayed in the first image area 51, the image control program 214 can automatically change the brightness of the operation panel 52. This technique is very effective for composing such a simulation game.

In step S5, the image control program 214 judges whether the mean brightness value of the predetermined area 53 obtained according to the brightness calculation program 216 is not more than a predetermined threshold.

In the case of judging in step S5 that the mean brightness value of the predetermined area 53 is not more than the predetermined threshold, the image control program 214 switches on the lights of the meters 54 on the operation panel 52 in step S6.

In the case of judging in step S5 that the mean brightness value of the predetermined area 53 is more than the predetermined threshold, the image control program 214 switches off the lights of the meters 54 on the operation panel S2 in step S7.

After step S6 or S7, the flow returns to step S1.

Video Game System

Figure 4:
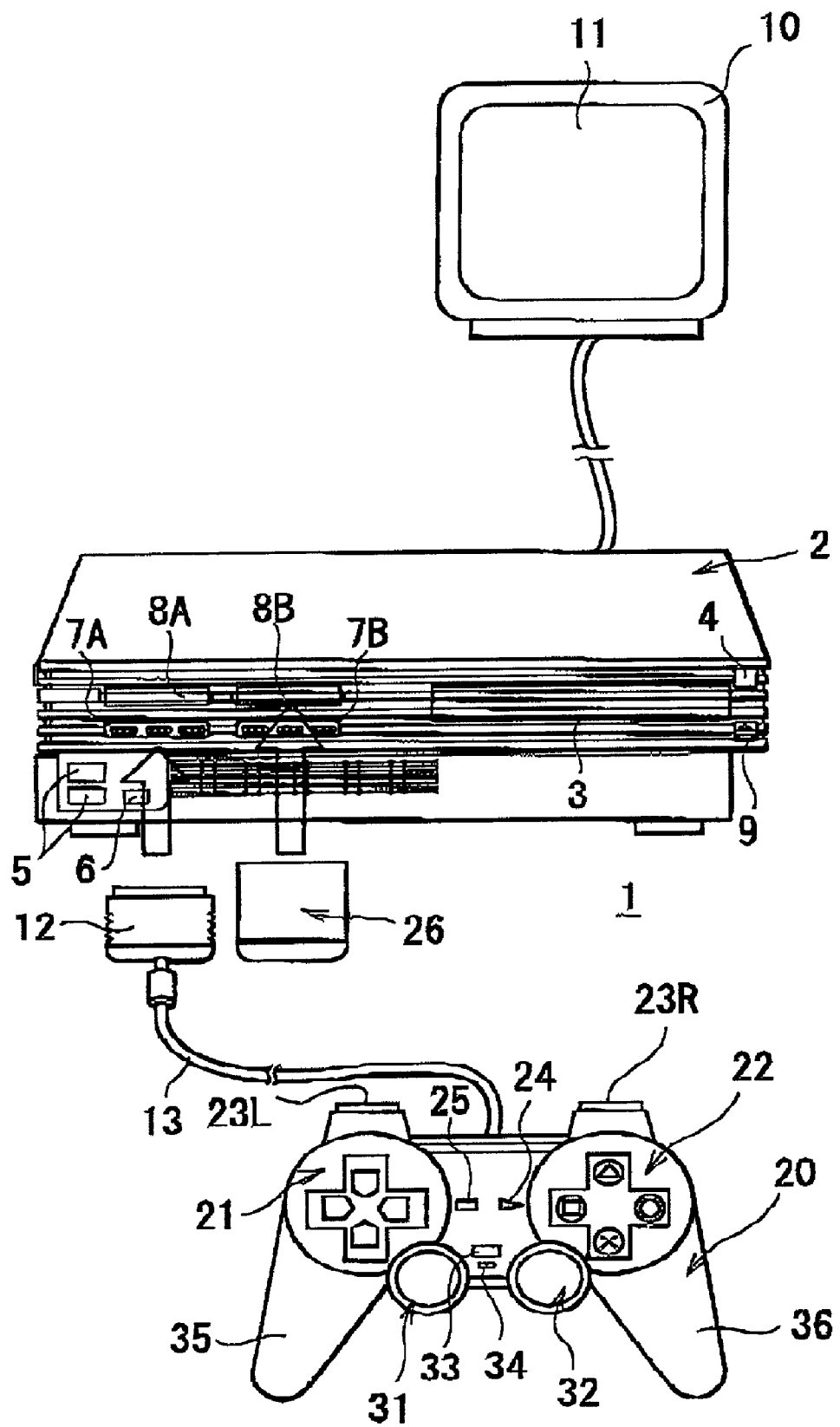
FIG. 4 illustrates a general construction of a video game system for executing the simulation game.

FIG. 4 illustrates a general configuration of a video game system for executing the video game The video game system 1 is an entertainment system comprised of a video game machine 2 as an example of program executing machine capable of executing the above-described game program and reproducing, e.g., a movie or the like, a controller 20 as an operation terminal connected to the video game machine 2 to be operated by a user (player), and a television monitor 10 for displaying thereon contents of the game, a movie, or the like, and outputting sounds.

General Construction of Video Game Machine

The video game machine 2 is provided with memory card slots 8A and 8B, controller ports 7A and 7R, a disk tray 3, buttons 4 and 9, an IEEE (Institute of Electrical and Electronics Engineers) 1394 connector 6, a USB (Universal Serial Bus) connector 5, etc. A memory card 26 can be inserted in each of the memory card slots 8A and 8B. A connector 12 provided at the end of a cable 13 extending from the controller 20 can be detachably connected to any one of the controller ports 7A and 7B. An optical disk such as a DVD-ROM or CD-ROM can be loaded on the disk tray 3. The button 9 is an open/close button for opening/closing the disk tray 3. The button 4 is an on/standby/reset button for turning the power on, setting a standby mode, and resetting a game. Although not illustrated, the video game machine 2 is further provided on its rear side with a power switch, audio and video output terminals (AV multi output terminals), a PC card slot, an optical digital output terminal, an AC power input terminal, etc.

The video game machine 2 executes the above-described game based on the game program read cut from a recording medium, e.g., an optical disk such as a CD-ROM or DVD-ROM, or a semiconductor memory, and instructions of the player through the controller 20. Alternatively, the video game machine 2 executes the game according to the game programs downloaded through various communication lines (transmission medium) such as a telephone line, a LAN, a CATV line, or a communication satellite line.

In the video game machine 2 illustrated in FIG. 4, two controllers 20 can be connected to the controller ports 7A and 7B. By connecting such two controllers 20 to the video game machine 2, two players can play the game. Besides, the video game machine 2 can store (save) various game data generated in execution of the video game into a memory card 26 attached to the memory card slot 8A or 8B, thereafter reading out the game data saved in the memory card 26 to restart the game from the state that the game has been interrupted last.

The video game machine 2 can execute a video game based on the game program thereof and reproduce (decode), e.g., audio data recorded on a CD, and video and audio data such as a movie recorded on a DVD. The video game machine 2 can operate based on various application programs other than those for games. The driver program for reproducing DVDs is stored in a memory card 26 for example. The video game machine 2, therefore, reads out the driver program from the memory card 26 attached to the memory card slot 8A or 8B, and then reproduces a DVD based on the driver program.

General Construction of Controller

The controller 20 is provided with a left grip 35, a right grip 36, a left operation area 21, a right operation area 22, a left analogue operation portion 31, a right analogue operation portion 32, a first left depression button 23L, a not-illustrated second left depression buttons, a first right depression button 23R, a not-illustrated second right depression button, etc. The left grip 35 is a portion for the player to grip so as to hold it within the palm of the left hand. The right grip 36 is a portion for the player to grip to hold it within the palm of the right hand. The left and right operation areas 21 and 22 are portions for the player to respectively operate with the left and right thumbs in the state where those grips 35, 36 are gripped with the left and right hands of the player. The left and right analogue operation portions 31 and 32 are portions for the player to respectively analog operate (operate the joystick) with the left and right thumbs in the state where the grips 35, 36 are gripped with the left and right hands of the player. The first left depression button 23L and the not-illustrated second left depression button disposed below the first left depression button 23L are buttons for the player to respectively operate by depressing with the left index finger and middle finger, for example. Also, the first right depression button 23R and the not-illustrated second right depression button disposed below the first right depression button 23R are buttons for the player to respectively operate by depressing with the right index finger and middle finger, for example.

The left operation area 21 are provided with an up key for moving a game character upward, a down key for moving the game character downward, a lest key for moving the game character leftward, and a right key for moving the game character rightward. In this video game, for example, the up and down keys may be used for moving a train forward and backward, respectively. These up, down, left, and right keys can be used for moving the game character vertically, horizontally and obliquely. For example, when the up and right keys are depressed at once, the game character moves in the upper right direction. Also, when the down and left keys are depressed at once, the game character moves in the lower left direction. The same applies to any other combination of these keys.

The right operation area 22 has four buttons ("Δ", "□", "x", and "○" buttons respectively provided with Δ, □, x, ○ shaped stamps) to each of which different functions can be assigned in accordance with game program. For examples, the "66" button is assigned a function of displaying a menu. The "x" button is assigned a function of canceling the selection of an item. The "○" button is assigned a function of determining the selection of an item. The "□" button is assigned a function of switching display/non-display of a list or the like. Note that the above-described assignment of function to each button or key is an example. Each button or key can be assigned various other functions in accordance with game programs.

Either of the left and right analogue operation portions 31 and 32 comprises an operation stick that can be inclined in an arbitrary direction around its vertical axis, and variable analogue value output means for outputting an analogue value in accordance with the operation of the operation stick. The operation stick is attached to the distal end of an operation shaft that is always returned to a neutral position by an elastic member. Thus, the operation stick is held stand (not inclined) when it is not operated. This position is referred to as home position The variable analogue value output means comprises, e.g., a variable resistance element whose resistance varies in accordance with the operation of the operation stick. When the operation stick of the left or right analogue operation portion 31 or 32 is inclined, values of X-Y coordinates corresponding to the inclination angle and direction from the home position are detected, and the detected coordinate values are sent to the video game machine 2 as an operation output signal. In the video game machine 2 of the present example, the speed of a train moving forward or backward may be controlled by the operation output signal from the left or right analogue operation portion 31 or 32.

The controller 20 is further provided with a mode selection switch 33, a light indicator 34, a select button 25, a start button 24, etc. The mode selection switch 33 is for selecting an operation mode, i.e., making the left and right operation areas 21 and 22 and the left and right analogue operation portions 31 and 32 active (analogue operation mode) or inactive (digital operation mode). The light indicator 34 comprises an LED (Light Emitting Diode) or the like for informing the player of the selected operation mode. The start button Z4 is used, e.g., when the player instructs the video game machine 2 to start or pause a game or reproduction. The select button 25 is used, e.g., when the player instructs the video game machine 2 to display a menu, an operation panel, or the like on the monitor screen 10. When the analogue operation mode is selected through the mode selection switch 33, the light indicator 34 is turned on and the left and right analogue operation portions 31 and 32 become active. When the digital operation mode is selected, the light indicator 34 is turned off and the left and right analogue operation portions 31 and 32 become inactive.

When the player operates any one of the buttons and operation portions on the controller 20, the controller 20 generates an operation signal in accordance with the operation and sends the operation signal to the video game machine 2 through the cable 13, the connector 12, and the controller port 7.

Besides, the controller 20 is provided with a vibration mechanism within each of the left and right grips 35 and 36. The vibration mechanism includes a weight eccentrically attached to the axis of a motor. The controller 20 is vibrated by the weight being rotated by the motor. The vibration mechanism operates following instructions from the video game machine 2 The controller 2 makes the vibration mechanism operate so that the vibration may be transmitted to the player's hand. In the present example, the video game machine 2 may make the vibration mechanism generate vibration of a train running on the railway track.

Internal Construction of Video Game Machine

A general internal circuit configuration of the video game machine 2 will be described below with reference to FIG. 5.

The video game machine 2 includes a main CPU 100, a graphic processor unit (GPU) 101, an IO processor (IOP) 104, an optical disk reproduction unit 112, a main memory (RAM) 105, a MASK ROM 106, a sound processor unit (SPU) 108, etc. The main CPU 100 performs signal processing and control of various internal components based on various application programs including the game program for implementing the above-described video game. The GPU 101 performs image processing. The IOP 104 performs processing for interfacing between the exterior and interior of the machine and for maintaining downward compatibility. The main memory 105 serves am a work area for the main CPU 100 and a buffer for temporarily storing data read out from an optical disk. The MASK ROM 106 stores therein an initial set program of the video same machine 2, a program for interrupting processing by the main CPU 100 or IOP 104 when any of switches and buttons are operated, to execute a process in accordance with the operation of the switch or button (so-called handler), etc. The SPU 108 performs sound signal processing. The optical disk reproduction unit 112 reproduces data from an optical disk such as a DVD-ROM or CD-ROM on which an application program or multimedia data is recorded. The optical disk reproduction unit 112 is comprised of a spindle motor, an optical pickup, an RF amplifier 113, a slide mechanism, etc. The spindle motor rotates an optical disk ouch as a DVD-ROM or CD-ROM. The optical pickup reads signals recorded on the optical disk. The slide mechanism moves the optical pickup radially off the disk. The RF amplifier 113 amplifies the output signal of the optical pickup.

The video game machine 2 is further provided with a CD/DVD digital signal processor (hereinafter referred to as DSP) 110, a driver 111, a mechanical controller 109, and a card-type connector (hereinafter referred to as PC card slot) 107. The DSP 110 converts the output signal of the RF amplifier 113 of the optical disk reproduction unit 112 into a binary signal, and performs, e.g., error correction processing (CIRC processing), extension coding processing, and so on, to the signal, thereby reproducing signals recorded on an optical disk. The driver 111 and the mechanical controller 109 perform rotation control of the spindle motor of the optical disk reproduction unit 112, focus/tracking control of the optical pickup, loading control of the disk tray, etc. The PC card slot 107 is an interface device for connecting the video game machine 2 with a communication card, an external hard disk drive, or the like.

These components are connected with each other mainly through bus lines 102 and 103. The main CPU 100 and the GPU 101 are connected with each other through a dedicated bus. Besides, the main CPU 100 and the IOP 104 are connected with each other through an SBUS. The IOP 104, the DSP 110, the MASK ROM 106, the SPU 108, and the PC card slot 107 are connected with each other through the SBUS.

The main CPU 100 executes the initial set program or the like stored in the MASK ROM 106 or executes an operating system program for main CPU read out from an optical disk, and thereby controls the entire operation of the video game machine 2. Besides, the main CPU 100 executes various application programs including the game program of the above-described video game, and thereby controls various operations of the video game machine 2. The various application programs may be read out from optical disks such as CD-ROMs or DVD-ROMs and then stored in the main memory 105, or downloaded through a communication network.

The IOP 104 executes an operating system program for IO processor stored in the MASK ROM 106, and thereby controls data input/output between the PAD/memory card connectors 7A, 7B, 8A, and 8B and the video game machine 2, data input/output between the USB connector 5 and the video game machine 2, data input/output between the IEEE 1394 connector 6 and the video game machine 2, data input/output between the PC card slot and the video game machine 2, and so on. Besides, the IOP 104 performs protocol conversion and so on of those data. The MASK ROM 106 also stores therein the device ID of this video game machine 2.

The GPU 101 has a function of a geometry transfer engine for coordinate conversion and so on, and a function of a rendering processor. The GPU 101 draws an image following instructions of the main CPU 100 and the stores the drawn image into a not-illustrated frame buffer. More specifically, in the case where various application programs stored in an optical disk use three-dimensional (3D) graphics as that of a video game, the GPU 101 performs, in a geometry operation process, calculation of the coordinates of polygons to draw a three-dimensional object, and so on. Further, the GPU 101 performs, in a rendering process, various calculations to make an image that may be obtained by taking the three-dimensional object by a virtual camera (virtual camera to determine a virtual view), i e., the GPU 101 performs a perspective conversion (calculation of the coordinate values of the vertexes of each polygon constituting the three-dimensional object when the vertexes are projected on a virtual camera screen, and so on). The GPU 101 finally writes the obtained image data into the frame buffer. The GPU 101 then outputs a video signal corresponding to the thus made image.

The SPU 108 has an ADPCM (Adaptive Differential Pulse Code Modulation) decoding function, an audio signal reproducing function, a signal modulating function, etc. The ADPCM decoding function is for decoding sound data that has been coded through an adaptive predictive coding process. The audio signal reproducing function is for reading out waveform data from a not-illustrated sound buffer incorporated in or externally connected with the SPU 108, to reproduce and output an audio signal such as sound effect. The signal modulating function is for modulating waveform data stored in the sound buffer to produce various sound waveform data. That is, the SPU 108 also serves as a sampling sound source for producing audio data for a music sound, a sound effect, or the like, from waveform data stored in the Round buffer, following instructions of the main CPU 100.

For example, when the video game machine 2 configured as described above is powered on, the initial set program for main CPU and the operating system program for IOP are read out from the MASK ROM 106. These read-out programs are executed by the main CPU 100 and the IOP 104, respectively. By the execution of the program, the main CPU 100 controls integrally each component of the video game machine 2. On the other hand, the IOP 104 controls signal input/output between the controller 20, a memory card 26, or the like, and the video game machine 2. Besides, the main CPU 100 performs initialization Such as operation check and so on, and then controls the optical disk reproduction unit 112 to read out an application program from an optical disk. After loading the application program into the main memory 105, the main CPU 100 executes the program. By the execution of the application program, the main CPU 100 controls the GPU 101 and the SPU 108 following player's instructions received from the controller 20 through the IOP 104 to control image display and production of a Sound effect, a music sound, or the like. Also in the case that the video game machine reproduces a movie recorded on an optical disk, the main CPU 100 controls the GPU 101 and the SPU 108 following player's instructions (commands) received from the controller 20 through the IOP 104 to control image display and production of a sound effect, a music sound, or the like, of the movie being reproduced from the optical disk.

The video game machine 2 changes the brightness of the operation panel 52 to be influenced by the light through the window in front area of the driver's seat in accordance with the change In brightness of the first image area 51, and switches on/off the light of each meter 54 on the operation panel 52 in accordance with the change in brightness of the first image area 51, thereby realizing a game with reality and sufficient ambience.

It is to be understood that the present invention is not limited to the above-described embodiment and various changes and modifications can be made without departing from the technical scope of the invention.

For example, the present invention is not limited to a game which simulates drive of the train, and is applicable to any other game using an actually-taken dynamic image.

Besides, the present invention is also applicable to a case wherein, for example, processing of changing sound or processing of giving various effects (visual and sound effects) is performed synchronously with a change in brightness of the first image area 51. The processing of changing sound (processing of changing a sound output parameter) is, e.g., processing of changing the BGM (Background Music) or processing of making echo. The processing of giving effects is, e.g., processing of detecting, based on the brightness of the first image area, an event that night has fallen or the train has entered a tunnel, and then switching on the light in the driver's room.

Further, the first image area 51 may provide not a dynamic image but a static image. Besides, the second image area 61 may provide not a dynamic or static image by computer graphics but an actually-taken image.

Figure 5:
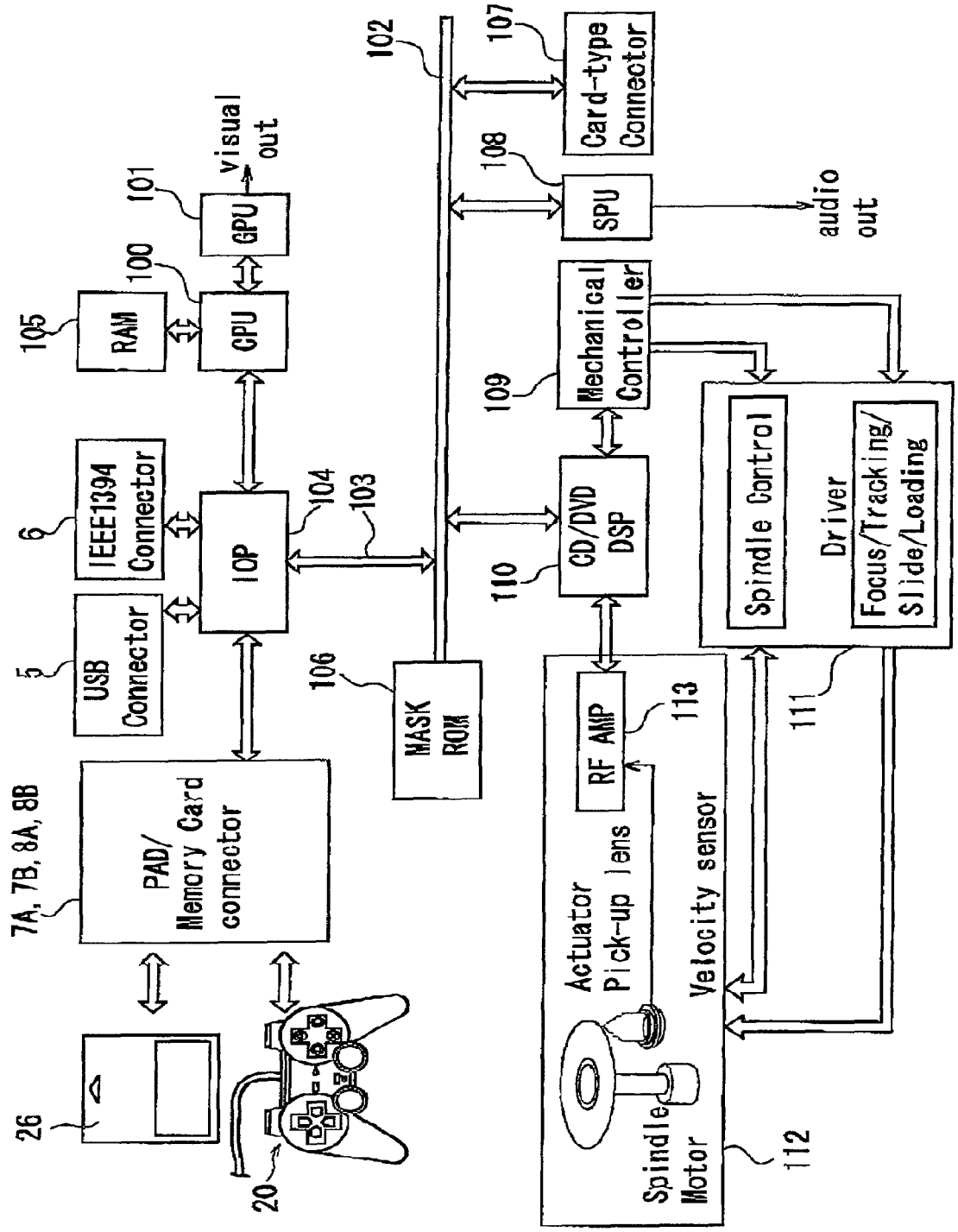
FIG. 5 is a block diagram of the internal circuit construction of a video game machine.

Further, the present invention is applicable to such a video game machine as illustrated in FIGS. 4 and 5, and to, e.g., personal computers and various portable information devices such as portable telephones and portable game machines.

What is claimed is:

1. A data processing method comprising the steps of:
    generating display image data including data of at least first and second images;
    determining a characteristic parameter of the first image; and
    setting a value of a display parameter of the second image as a function only of the determined value of the characteristic parameter of the first image; such that the value of the display parameter of the second image increases as the value of the characteristic parameter of the first image increases, and the value of the display parameter of the second image decreases as the value of the characteristic parameter of the first image decreases, wherein
    the first image and the second image respectively provide a stored image in a recording means, and
    the value of the characteristic parameter of the first image is determined based on first image data from the recording means.

2. The method according to claim 1, wherein the characteristic parameter is determined based on images composing a dynamic image.

3. The method according to claim 1, wherein the display parameter of the second image is changed synchronously with a change in the characteristic parameter of the first image.

4. The method according to claim 1, wherein the characteristic parameter is a mean brightness value of at least part of the first image providing actually-taken scenes.

5. The method according to claim 1, wherein the display parameter is a brightness of at least part of the second image.

6. The method according to claim 1, further comprising the steps of:
    generating sound data; and
    changing an output parameter for the sound data as a results of detecting an event, said event being detected based on the value of the characteristic parameter of the first image.

7. A computer-readable recording medium recording thereon a data processing program to be executed on a computer, the program comprising:
    a first generating step of generating display image data including data of at least first and second images;
    a determining step of determining a characteristic parameter of the first image; and
    a first changing step of setting a value of a display parameter of the second image as a function only of the value of the determined characteristic parameter of the first image, such that the value of the display parameter of the second image increases as the value of the characteristic parameter of the first image increases, and the value of the display parameter of the second image decreases as the value of the characteristic parameter of the first image decreases, wherein
    the first image and the second image respectively provide a stored image in a recording means, and
    the value of the characteristic parameter of the first image is determined based on first image data from the recording means.

8. The medium according to claim 7, wherein, in the determining step, the characteristic parameter is determined based on images composing a dynamic image.

9. The medium according to claim 7, wherein, in the first changing step, the display parameter of the second image is changed synchronously with a change in the characteristic parameter of the first image.

10. The medium according to claim 7, wherein, in the determining step, a mean brightness value of at least part of the first image providing actually-taken scenes is determined as the characteristic parameter of the first image.

11. The medium according to claim 7, wherein, in the first changing step, a brightness of at least part of the second image is changed as the display parameter of the second image.

12. The medium according to claim 7, wherein the program further comprising:
    a second generating step of generating sound data; and
    a second changing step of changing an output parameter for the sound data as a result of detecting an event, said event being detected based on the value of the characteristic parameter of the first image.

13. An information processing apparatus comprising:
    a first generating unit, that generates display image data including data of at least first and second images;
    a determining unit, that determines a value of a characteristic parameter of the first image; and
    a first changing unit, that sets a value of a display parameter of the second image as a function only of the value of the determined characteristic parameter of the first image, such that the value of the display parameter of the second image increases as the value of the characteristic parameter of the first image increases, and the value of the display parameter of the second image decreases as the value of the characteristic parameter of the first image decreases, wherein
    the first image and the second image respectively provide a stored image in a recording means, and
    the value of the characteristic parameter of the first image is determined based on first image data from the recording means.

14. The information processing apparatus according to claim 13, wherein the determining unit determines the characteristic parameter based on images composing a dynamic image.

15. The information processing apparatus according to claim 13, wherein the first changing unit changes the display parameter of the second image synchronously with a change in the characteristic parameter of the first image.

16. The information processing apparatus according to claim 13, wherein the determining unit determines a mean brightness value of at least part of the first image providing actually-taken scenes, as the characteristic parameter of the first image.

17. The information processing apparatus according to claim 13, wherein the first changing unit changes a brightness of at least part of the second image as the display parameter of the second image.

18. The information processing apparatus according to claim 13, further comprising:
   a second generating unit, that generates sound data; and
   a second changing unit, that changes an output parameter for the sound data as a result of detecting an event, said event being detected based on the value of the characteristic parameter of the first image.

19. A computer executing a data processing program, the data processing program performing the steps of:
   generating display image data including data of at least first and second images;
   determining a value of a characteristic parameter of the first image; and
   setting a value of a display parameter of the second image as a function only of the value of the determined characteristic parameter of the first image, such that the value of the display parameter of the second image increases as the value of the characteristic parameter of the first image increases, and the value of the display parameter of the second image decreases as the value of the characteristic parameter of the first image decreases, wherein
   the first image and the second image respectively provide a stored image in a recording means, and
   the value of the characteristic parameter of the first image is determined based on first image data from the recording means.

20. The data processing method of claim 1, further comprising the steps of:
   judging whether the value of the characteristic parameter of the first image has crossed a predetermined threshold; and
   changing at least one element of the display of the second image when the predetermined threshold has been crossed.

21. The data processing method of claim 20, wherein the at least one element is an operation panel display, the value of the characteristic parameter is a mean brightness value, and a display light on the operation panel display is changed from an unlit condition to a lit condition when the mean brightness value falls below the predetermined threshold, and is changed from a lit condition to an unlit condition when the mean brightness value rises above the predetermined threshold.

22. The information processing apparatus of claim 13, wherein:
   the determining unit further determines whether the value of the characteristic parameter of the first image has crossed a predetermined threshold; and
   the first changing unit changes at least one element of the display of the second image when the predetermined threshold has been crossed.

23. The information processing apparatus of claim 22, wherein the at least one element is an operation panel display, the value of the characteristic parameter is a mean brightness value, and a display light an the operation panel display is changed from an unlit condition to a lit condition when the mean brightness value falls below the predetermined threshold, and is changed from a lit condition to an unlit condition when the mean brightness value rises above the predetermined threshold.

* * * * *